US005521810A

United States Patent [19]

Yamaguchi et al.

[11] Patent Number: 5,521,810

[45] Date of Patent: May 28, 1996

[54] RECTIFYING SATURABLE REACTOR

[75] Inventors: Sataro Yamaguchi, Tokyo; Hiroyuki Sasao, Hyogo; Hiroshi Hasegawa, Kagawa; Kazuo Ikeda, Hyogo, all of Japan

[73] Assignee: Mitsubishi Denki Kabushiki Kaisha, Tokyo, Japan

[21] Appl. No.: 461,550

[22] Filed: Jun. 5, 1995

Related U.S. Application Data

[63] Continuation of Ser. No. 9,398, Jan. 27, 1993, abandoned, which is a continuation of Ser. No. 798,105, Nov. 26, 1991, abandoned.

[30] Foreign Application Priority Data

Nov. 29, 1990 [JP] Japan .................................... 2-336128

[51] Int. Cl.[6] ............................ H02M 7/04; H01F 17/06

[52] U.S. Cl. ............................ 363/91; 363/128; 336/175

[58] Field of Search .................................... 363/135, 136, 363/128, 125, 91, 84, 82; 336/174, 175, 176, 233, 234

[56] References Cited

U.S. PATENT DOCUMENTS

| | | | |
|---|---|---|---|
| 1,763,150 | 6/1930 | Hebrew | 336/175 |
| 1,857,215 | 5/1932 | Ruder | 336/175 |
| 2,568,003 | 9/1951 | Hartmann | 336/175 |
| 2,916,696 | 12/1959 | Schonstedt | 336/175 |
| 3,042,849 | 7/1962 | Dortort | 336/175 |
| 3,175,175 | 3/1965 | Hauck | 336/175 |
| 3,343,074 | 9/1967 | Brock | 336/175 |
| 3,368,137 | 2/1968 | Kennard et al. | 336/175 |
| 3,451,023 | 6/1969 | Aveyard et al. | 336/175 |
| 3,614,694 | 10/1971 | Koontz | 336/175 |
| 3,946,300 | 3/1976 | Landis | 336/175 |
| 4,338,657 | 7/1982 | Lisin et al. | 336/175 |
| 4,740,858 | 4/1988 | Yamaguchi et al. | 361/4 |
| 4,746,891 | 5/1988 | Zylstra | 336/175 |
| 4,849,649 | 7/1989 | Roche et al. | 336/175 |
| 4,942,511 | 7/1990 | Lipo et al. | 363/136 |

FOREIGN PATENT DOCUMENTS

| | | |
|---|---|---|
| 750109 | 6/1956 | United Kingdom . |
| 800412 | 8/1958 | United Kingdom . |
| 848700 | 9/1960 | United Kingdom . |
| 905350 | 9/1962 | United Kingdom . |
| 1452098 | 10/1976 | United Kingdom . |

*Primary Examiner*—Peter S. Wong
*Assistant Examiner*—Adolf Berhane
*Attorney, Agent, or Firm*—Burns, Doane, Swecker & Mathis

[57] ABSTRACT

A rectifying saturable reactor generates a magnetic force in a magnetic iron core in response to a current that flows through an electronic circuit. The saturable reactor makes use of saturable magnetic flux in view of a hysteresis loop of a magnetic material for rectification and selects the saturated magnetic flux to be greater than an integrated value of a voltage applied to the rectifier in the rectifying circuit. In order to improve a rectifying performance, a no cut and one turn structure or an equivalent is introduced into a magnetic core for providing a hysteresis loop that varies as much as possible in magnetic induction.

8 Claims, 4 Drawing Sheets

RECTIFYING SATURABLE REACTOR

This application is a continuation of application Ser. No. 08/009,398, filed Jan. 27, 1993, now abandoned, which is a continuation of application Ser. No. 07/798,105, filed Nov. 26, 1991, now abandoned.

BACKGROUND OF THE INVENTION

1. Field of the Invention

This invention relates to a rectifying circuit and, more particularly, to a circuit having a surge-proof rectifying element having a high current capacity.

2. Description of the Prior Art

A rectifier diode is common in the art for use in an electric circuit for rectifying a current. As known, the rectifier diode consists of a junction of P-type and N-type semiconductors provided by doping impurities into a monocrystal of silicon or germanium, an example of which is shown in FIG. 1.

The P-type semiconductor is provided by doping aluminum into the monocrystal of silicon or germanium for forming holes therein. In like way, the N-type semiconductor is provided by doping antimony into the monocrystal of silicon and germanium for forming free electrons therein.

The rectifier diode is then produced by joining them together, as shown in FIG. 1, into one element. In the rectifier diode of FIG. 1, numeral 10 designates conductors, an element 11 designates the P-type semiconductor and an element 12 designates the N-type semiconductor.

In such a rectifier diode, a current flows easily in a direction indicated by an arrow but not in the opposite direction. This is called a rectifying phenomenon and is well known amongst electronic engineers. Further, there are many publications disclosing the rectifying theory, so that no further description will be made herein.

The semiconductor diode has problems including (1) it is expensive, (2) it is weak against a surge voltage and (3) it has a narrow margin for current capacity.

It is therefore an object of this invention to eliminate the problems encountered by semiconductor rectifiers and to provide a rectifying element having a superior surge-proof characteristic and a wide margin for current capacity at a low cost of production.

SUMMARY OF THE INVENTION

A rectifying element in accordance with this invention generates a magnetic force in a magnetic material in response to a current that flows through an electronic circuit, whereby the saturable magnetic flux in the magnetic material is utilized for rectification, and the saturated magnetic flux is as selected as to be greater than a time integrated value of a voltage being applied to the rectifying element in the electronic circuit.

More precisely, the rectification of the rectifying element in accordance with this invention is implemented by making use of the hysteresis characteristics of the magnetic material.

To improve a rectifying performance a no cut and one turn structure or an equivalent is introduced into the magnetic material forming a magnetic circuit for obtaining a hysteresis loop wherein a magnetic flux density B varies as much as possible.

DETAILED DESCRIPTION OF THE PREFERRED EMBODIMENTS

A preferred embodiment of this invention will now be described in detail by referring to the accompanying drawings.

Figure 1:
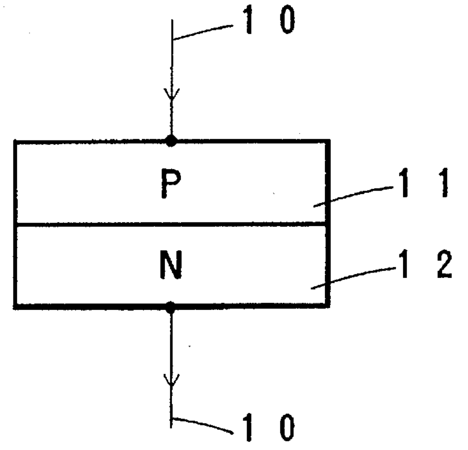
FIG. 1 PRIOR ART
FIG. 1 is a schematic diagram showing a cross sectional view of a semiconductor rectifier of the prior art.
Figure 2:
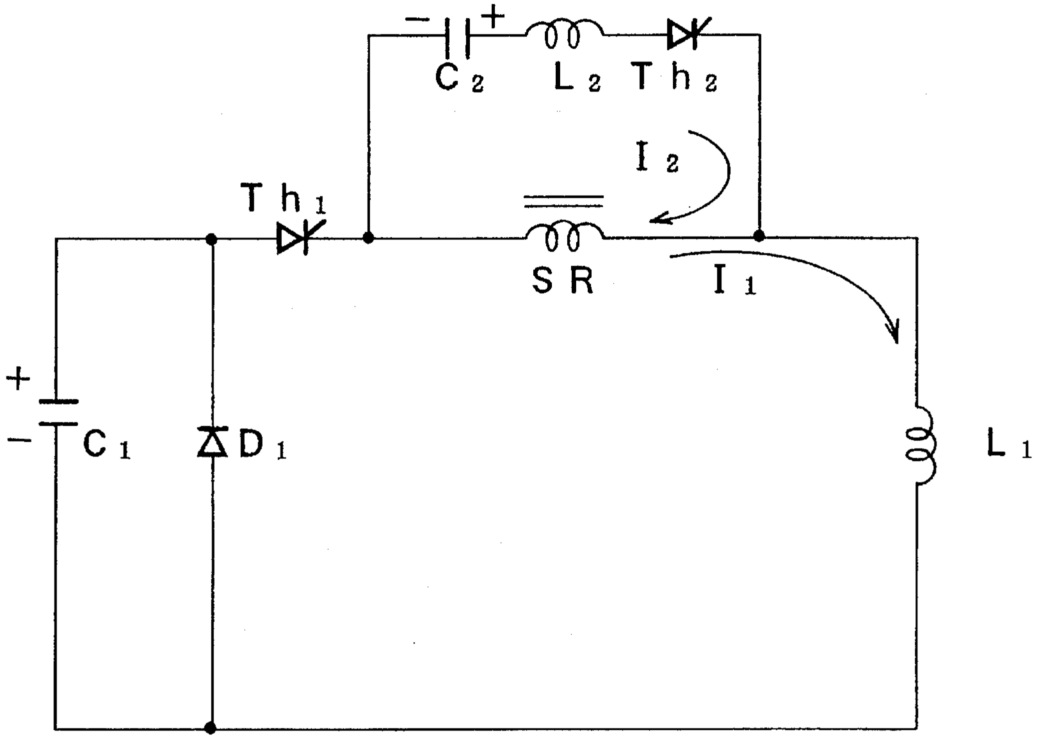
FIG. 2 is a circuit diagram including a rectifying saturable reactor embodying the present invention.

Referring first to FIG. 2, there is shown a rectifying circuit including a rectifying saturable reactor embodying the present invention, wherein a capacitor C1 constitutes a main capacitor bank and is charged with a polarity as shown, and from which, a current I1 is fed to a load inductor L1 through a thyristor Th1 and a rectifying saturable reactor SR. An element D1 is a clover diode for rectifying a current that flows through the load inductor L1 into a DC current. An element C2 is a commutation capacitor bank and is charged with a polarity as shown. An element L2 is an inductor for regulating a current waveform and an element Th2 is a thyristor. A commutation circuit is formed by the commutation capacitor C2, the inductor L2 and the thyristor Th2.

Figure 3:
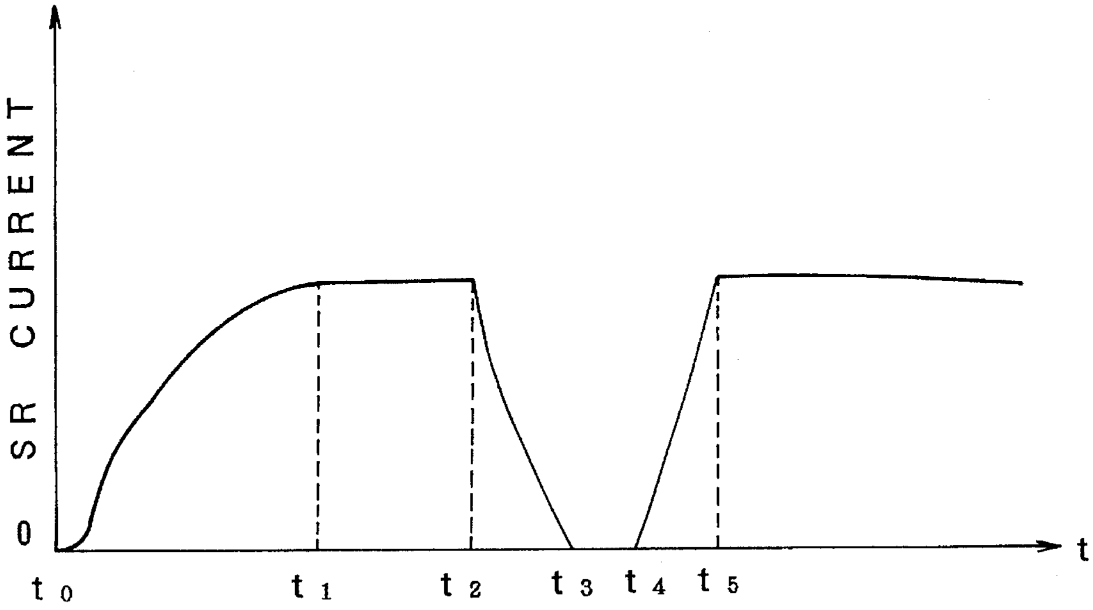
FIG. 3 is a waveform diagram showing a current that flows through the circuit of FIG. 2.

Now operation of the circuit of FIG. 2 will be described by referring to FIG. 3, wherein a SR current IsR that follows through the rectifying saturable reactor SR is shown by a waveform.

Upon turning on the thyristor Th1 at time t0, a current starts flowing therethrough and reaches to a peak. A voltage at the main capacitor bank C1 is then reversed in polarity, and the clover diode D1 is automatically turned on (at time t1). A circulating current starts to flow in a loop circuit of D1→Th1→SR→L1→D1, thus decreasing a rate of change of the current.

Upon turning on the thyristor Th2 at time t2, a current Iz starts to flow into the rectifying saturable reactor SR from the commutation capacitor bank C2, decreasing the SR current rapidly. The rectification by the rectifying saturable reactor SR is performed in a duration of t3–t4, and the SR current is increased once again when the voltage across the rectifying saturable reactor SR is reversed in polarity correspondingly to the discharge of the commutation capacitor bank C2, thus recovering to the original state.

The rectification of the rectifying saturable reactor SR will be described hereinafter based on a theoretical basis.

Figure 4:
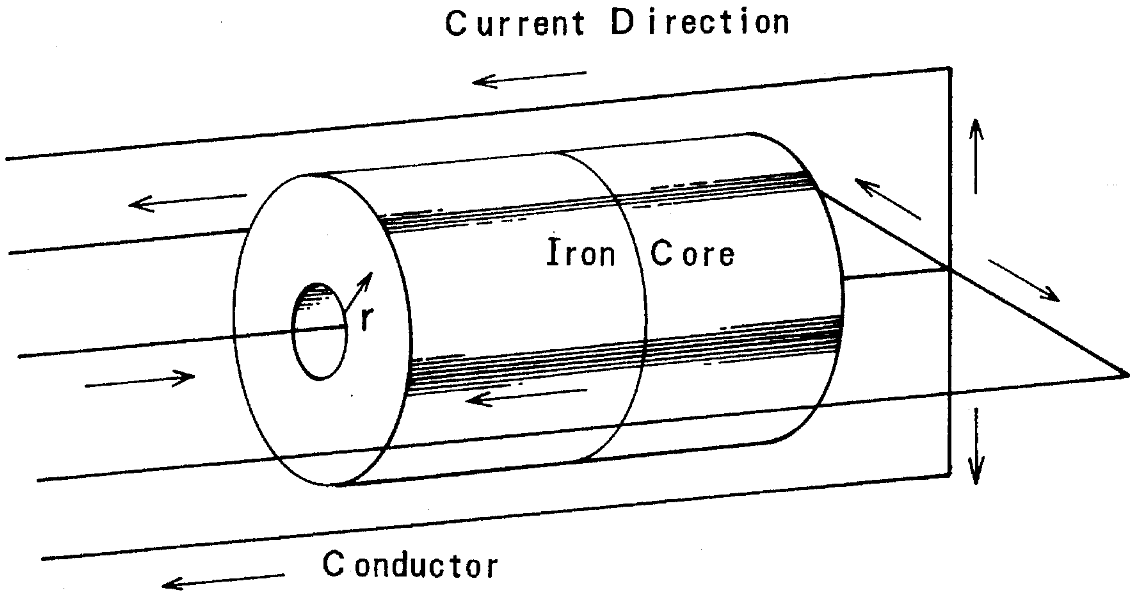
FIG. 4 is a one turn structural diagram showing the rectifying saturable reactor embodying the present invention.

Now referring to FIG. 4, there is shown a rectifying saturable reactor SR embodying the present invention. A silicon steel plate of ferromagnetic substance is rolled into a cylindrical shape for forming a magnetic iron core, and a wire conductor passes therethrough in such a way as shown in FIG. 4. A magnetic intensity H to be generated by a current that flows through the wire conductor is axially symmetrical and given by:

$$H = \frac{I_{SR}}{2\pi\gamma} \quad (1)$$

where, ISR is the SR current and $\gamma$ is a distance from the center of the conductor.

Figure 5A:
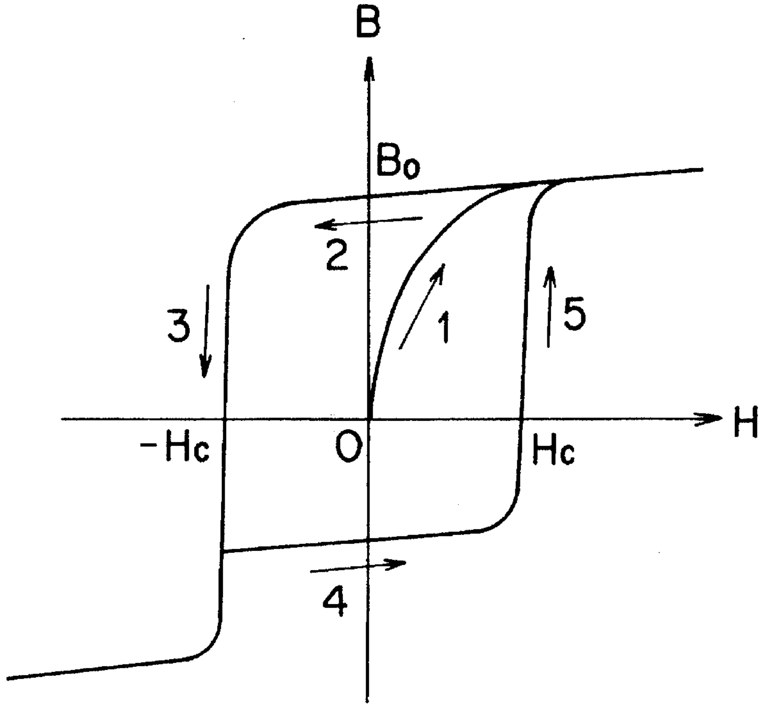
FIGS. 5A and 5B are diagrams for illustrating a hysteresis loop of a magnetic core of the rectifying saturable reactor and a current that flows therethrough.

Magnetic iron cores have hysteresis characteristics and one of which is shown in FIG. 5A, wherein that axis designates the magnetic intensity H, which is given by the equation (1) above, while they axis designates the magnetic induction B, which depends on a magnetic material being employed.

As it is apparent from the equation (1), once the structure of the rectifying saturable reactor SR is determined, the magnetic intensity H corresponds substantially to the SR current, and thereby a value along the X axis of FIG. 5A may be considered an amount of current. By integrating the magnetic induction B in a cross sectional plane of the iron core, the magnetic flux Φ of the iron core may be obtained. A circuit equation for the magnetic flux Φ may be expressed with use of an inductance and current.

Accordingly, the magnetic flux Φ will be given by:

$$\Phi = \int \vec{B} \cdot \vec{ds} \; \alpha \; L_{SR} \cdot I_{SR} \quad (2)$$

where, a surface integral is implemented at the cross section of the iron core, Ls is the effective inductance and ISR is the current that flows through the conductor.

Consequently, a gradient of the hysteresis loop of FIG. 5A corresponds to a value of inductance, whereas the steeper the gradient, the larger the inductance.

Figure 5B:
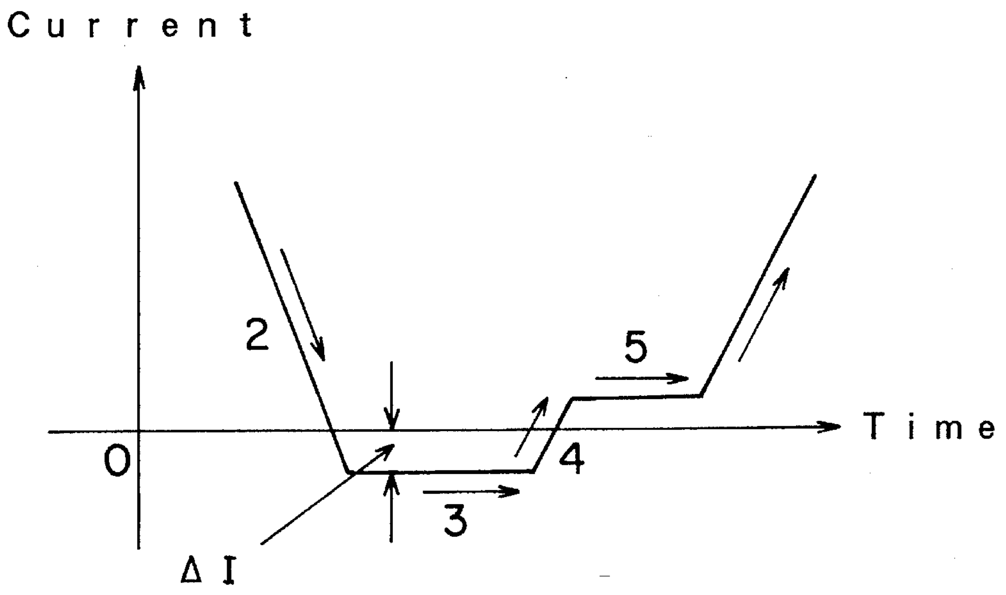

A waveform of the current that flows through the rectifying saturable reactor SR will now be described in view of the hysteresis characteristic of the iron core. The hysteresis characteristic of the iron core is shown in FIG. 5A while the waveform of the current that flows through the rectifying saturable reactor SR is shown in FIG. 5B. Numerals 1–5 in the FIGS. 5A and 5B correspond to each other.

Upon closing the thyristor Th1, the SR current starts to flow through the rectifying saturable reactor SR, and the iron core will be saturated with magnetic flux shortly thereafter. This process is shown by numeral 1 in FIGS. 5A and 5B. Next, upon initiation of the commutation circuit (closing the thyristor Th2) for decreasing the current in the rectifying saturable reactor SR, there is traced a trajectory indicated by numeral 2 in the hysteresis loop of FIG. 5A. Since the gradient of the trajectory 2 is quite small in the hysteresis loop and the effective inductance of the rectifying saturable reactor SR is very small in value, the majority of the current from the commutation circuit may flow in this duration.

When a value of magnetic intensity H becomes negative (accordingly, the current becomes negative as well), the hysteresis loop abruptly changes its trajectory as shown by numeral 3. This phenomenon corresponds to a state wherein the effective inductance of the rectifying saturable reactor SR is increased to a great extent in view of circuitry analysis. Accordingly, the current in the rectifying saturable reactor SR varies very slowly and substantially has a constant negative value as shown in FIG. 5B. The negative current value of ΔI depends upon the characteristics of the rectifying saturable reactor SR and is normally an order of 10A in accordance with experiments carried out (hereinafter described) in embodying the present invention. When a polarity of the current in the commutation circuit is reversed through discharging of the commutation capacitor bank C2, the current in the rectifying saturable reactor SR increases as shown by numeral 4 in FIG. 5B. Hence, the current remains at the constant positive value (an order of 10A) until the iron core is saturated with magnetic flux, and finally, the current may be restored to the original value with a time constant determined by an exterior circuitry.

As it has been described above, since the current ΔI is extremely small in value as compared with a normal conduction current (an order of 10kA), the current ΔI may be considered a leakage current of a rectifying element. Consequently, it is apparent that the rectifying saturable reactor SR can be utilized as a rectifying element.

Figure 6:
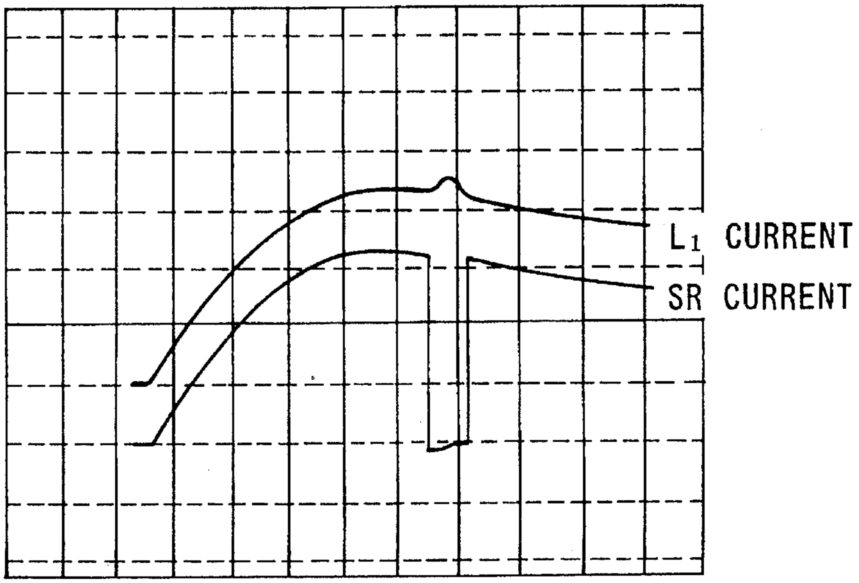
FIGS. 6 and 7 are waveform diagrams obtained in experiments for operating the rectifying saturable reactor embodying the present invention.
Figure 7:
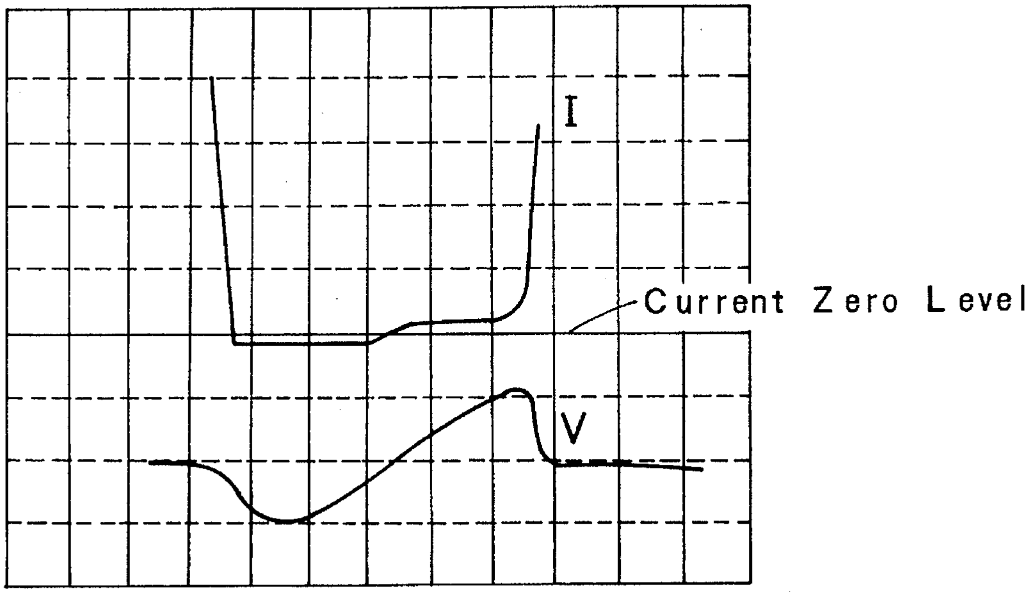

Waveforms shown in FIGS. 6 and 7 are obtained through the experiments carried out by utilizing the circuit of FIG. 2, wherein a capacity of the capacitor bank C1 is 3.5kV, 550kJ, an inductance of the inductor L1 is 2mH, a capacity of the capacitor bank C2 is 5kV, 45kJ, and an inductance of the inductor L2 is 130μH. The waveforms shown in FIG. 6 are those of currents in the inductor L1 and the rectifying saturable reactor SR when the capacitor bank C1 is charged up to 3.5kV and the capacitor bank C2 to 4.11kV. As seen, the current in the rectifying saturable reactor SR is decreased abruptly when the commutation circuit is closed, and then recovered after rectification being performed, while the current in the inductor L1 is increased temporarily by an amount fed from the commutation circuit.

FIG. 7 is an enlarged view of the waveforms illustrating the variation of the SR current and SR voltage in the proximity of zero level. It is to be understood that the SR current has a very similar waveform to that of FIG. 5B and the theory of rectification for the saturable reactor is positively proved through these experiments.

Further, in the preferred embodiment described above, only the cylindrically rolled silicon steel plate has been employed as the magnetic iron core, however, amorphous metal, ferrite and the like may be substituted for the silicon steel plate or an iron core of different shape may concurrently be provided for improving the rectifying performance.

On the other hand, a voltage may be impressed directly on the magnetic material in the operation. It is required to provide the magnetic material with electrical insulation around the surface thereof.

As it has been described above, in accordance with the present invention, since the hysteresis characteristic of the iron core is adapted for the rectification, it is possible to provide a rectifying element inexpensive in productive cost and endurable against a high surge voltage, while having a large current capacity.

Accordingly, it is to be understood by those skilled in the art that the foregoing descriptions are only illustrative and that various changes and modifications may be made in the invention without departing from the scope of the invention as defined in the appended claims and the equivalents thereof.

What is claimed is:

1. A rectifier circuit comprising a source of current for supplying a first current;

a saturable reactor having electrically conductive center means for conducting a current, the center means being encircled by a magnetically saturable material, the saturable reactor being connected in series with a load and arranged such that the magnetically saturable material is saturated with magnetic flux by the first current flowing through the electrically conductive center means; and a commutation circuit arranged to make a second current flow through the electrically conductive center means in a direction opposite to that of the first current, the second current being greater than the first current so as to reverse the current flow within the saturable reactor and thereby drive the saturable reactor out of saturation thereby causing the inductance of the saturable reactor to increase, the second current being insufficient to drive the saturable reactor into a saturated state opposed to that established by the first current.

2. A rectifying circuit as claimed in claim 1, further comprising return current conducting means, arranged in close proximity to the electrically conducting center means, for conducting a return current.

3. A rectifying circuit as claimed in claim 1 in which the magnetically saturable means is a cylindrically rolled silicon steel plate core.

4. A rectifying circuit as claimed in claim 2 in which the magnetically saturable means is a cylindrically rolled silicon steel plate core.

5. A rectifying circuit as claimed in claim 1 in which the magnetically saturable means is an amorphous metal core.

6. A rectifying circuit as claimed in claim 2 in which the magnetically saturable means is an amorphous metal core.

7. A rectifying circuit as claimed in claim 1 in which the magnetically saturable means is a ferrite core.

8. A rectifying circuit as claimed in claim 2 in which the magnetically saturable means is a ferrite core.

* * * * *